United States Patent
Wager

(10) Patent No.: US 9,961,597 B2
(45) Date of Patent: *May 1, 2018

(54) ACTIVATION TIME FOR TARGET BASED HIGH SPEED SERVING CELL CHANGE

(71) Applicant: TELEFONAKTIEBOLAGET L M ERICSSON (PUBL), Stockholm (SE)

(72) Inventor: Stefan Wager, Espoo (FI)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 136 days.

This patent is subject to a terminal disclaimer.

(21) Appl. No.: 14/862,938

(22) Filed: Sep. 23, 2015

(65) Prior Publication Data

US 2016/0014652 A1    Jan. 14, 2016

Related U.S. Application Data

(63) Continuation of application No. 14/101,249, filed on Dec. 9, 2013, now Pat. No. 9,185,624, which is a (Continued)

(51) Int. Cl.
*H04W 36/00* (2009.01)
*H04W 36/36* (2009.01)
(Continued)

(52) U.S. Cl.
CPC ....... *H04W 36/0083* (2013.01); *H04W 36/36* (2013.01); *H04W 36/08* (2013.01); *H04W 84/042* (2013.01)

(58) Field of Classification Search
CPC ..... H04W 36/24; H04W 36/26; H04W 36/36; H04W 72/12; H04W 72/1205;
(Continued)

(56) References Cited

U.S. PATENT DOCUMENTS 5,949,769 A * 9/1999 Davidson .............. H04L 5/1446
370/329
6,041,088 A * 3/2000 McCallister ...... H04W 56/0035
370/324
(Continued)

FOREIGN PATENT DOCUMENTS

WO    1999/23847 A    5/1999
WO    2001/67788 A2   9/2001

OTHER PUBLICATIONS

Ericsson: HS-PDSCH Serving Cell Change Enhancements, 3GPP TSG-RAN WG2 #61bis R2-081500, Apr. 8, 2008.
(Continued)

*Primary Examiner* — David Oveissi
*Assistant Examiner* — Jonathan B Wood

(57) ABSTRACT

The present solution relates to a method in a user equipment (310) for setting up an activation time of a cell change of the user equipment (310) from a serving cell (305) to a target cell (308) in a wireless communications network (300). The user equipment (310) receives (501) a timing offset from a network controller (315), calculates (502) a cell change activation time based on the timing offset and transmits (503) the calculated activation time to the network controller (315). Then, the user equipment (310) receives (504) an approval of the cell change from the network controller (315) and moves (505) from the serving cell (306) to the target cell (308) at the activation time if the approval has been received.

22 Claims, 6 Drawing Sheets

Related U.S. Application Data continuation of application No. 12/935,941, filed as application No. PCT/SE2009/050285 on Mar. 19, 2009, now Pat. No. 8,606,277.

(60) Provisional application No. 61/041,283, filed on Apr. 1, 2008.

(51) Int. Cl.
*H04W 36/08* (2009.01)
*H04W 84/04* (2009.01)

(58) Field of Classification Search
CPC ......... H04W 72/1231; H04W 72/1263; H04W 72/1271; H04W 72/1289; H04L 5/003; H04L 5/0078; H04L 5/0098
See application file for complete search history.

(56) References Cited

U.S. PATENT DOCUMENTS

| | | | |
|---|---|---|---|
| 6,430,417 B1 | 8/2002 | Raith | |
| 7,876,792 B2 | 1/2011 | Grilli | |
| 7,917,113 B2 | 3/2011 | Palenius | |
| 8,010,108 B2 | 8/2011 | Randall | |
| 8,520,632 B2 | 8/2013 | Hsu | |
| 8,606,277 B2 | 12/2013 | Wager | |
| 2003/0045288 A1 | 3/2003 | Luschi | |
| 2003/0108027 A1 | 6/2003 | Kim | |
| 2003/0232622 A1 | 12/2003 | Seo | |
| 2004/0176094 A1 | 9/2004 | Kim | |
| 2005/0036619 A1 | 2/2005 | Funnell | |
| 2005/0037759 A1 | 2/2005 | Sipila | |
| 2005/0086466 A1 | 4/2005 | Funnell | |
| 2005/0176437 A1 | 8/2005 | Mir | |
| 2005/0181799 A1 | 8/2005 | Laroia | |
| 2005/0207374 A1 | 9/2005 | Petrovic | |
| 2006/0009210 A1* | 1/2006 | Rinne | H04W 48/12 455/423 |
| 2006/0030324 A1* | 2/2006 | Hsu | H04W 36/30 455/437 |
| 2006/0094433 A1 | 5/2006 | Cheng | |
| 2006/0240831 A1 | 10/2006 | Toskala | |
| 2006/0270406 A1 | 11/2006 | Kim | |
| 2007/0069952 A1* | 3/2007 | Ling | G01S 5/0226 342/463 |
| 2007/0072621 A1* | 3/2007 | Mukkavilli | G01S 5/021 455/456.1 |
| 2007/0155388 A1 | 7/2007 | Petrovic | |
| 2008/0253334 A1 | 10/2008 | Torsner | |
| 2008/0311923 A1 | 12/2008 | Petrovic | |
| 2009/0168750 A1* | 7/2009 | Pelletier | H04W 52/50 370/350 |

OTHER PUBLICATIONS

Ericsson: Introduction of HS-DSCH Cell Change Enhancements, 3GPP TSG RAN WG2 #62bis R2-083128, Jul. 4, 2008.

Nokia Corporation, et al.: "HS-DSCH serving cell change procedure," 3GPP Draft; R2-081901 HS-DSCH Serving Cell Change Procedure, 3rd Generation Partnership Project (3GPP), Mobile Competence Centre; 650, Route des Lucioles; F-06921 Sophia-Antipolis Cedex; France, vol. RAN WG2, no. Shenzhen, China; Mar. 25, 2008.

Ericsson: "HS-PDSCH Serving Cell Change Enhancements;" 3GPP TSG RAN WG1 Meeting #53; R1-081883, May 5-9, 2008.

* cited by examiner

ACTIVATION TIME FOR TARGET BASED HIGH SPEED SERVING CELL CHANGE

CROSS-REFERENCE TO RELATED APPLICATIONS

This application is a continuation of U.S. application Ser. No. 14/101,249, filed Dec. 9, 2013, which is a continuation of U.S. application Ser. No. 12/935,941, filed Oct. 1, 2010, now U.S. Pat. No. 8,606,277, which was the national stage of International Application No PCT/SE2009/050285, with an international filing date of Mar. 19, 2009 and which claims the benefit of U.S. Provisional Application No. 61/041283, filed Apr. 1, 2008, and the contents of all of the preceding are hereby incorporated by reference herein.

TECHNICAL FIELD

The present solution relates to a method and arrangement in a telecommunications system, in particular it relates to a method and arrangement for synchronizing a high speed downlink shared channel (HS-DSCH) serving cell change (HSCC) procedure in a telecommunications system.

BACKGROUND

A Universal Mobile Telecommunications System (UMTS) or third generation (3G) network can be separated into a number of major components, namely one or more core networks which are responsible for setting up and controlling user sessions, and a UMTS radio access network (UTRAN) which controls access to the air interface. The interface between UTRAN and user equipment (UE) is provided by nodes that may be referred to as "Node B" (analogous to base stations in 2G/GSM networks) or base stations. NodeBs are responsible for transmitting and receiving data over the air interface and are controlled by radio network controllers. User and control data are routed between a base station and a core network via the base station and the radio network controllers. The interface between a base station and a radio network controller is referred to as the Iub interface. The interface between two radio network controllers in the same network is referred to as the Iur interface. A Iu interface carries user traffic (such as voice or data) as well as control information, and is mainly needed for soft handovers. Soft handover refers to a feature used by the Code Division Multiple Access (CDMA) and Wideband Code Division Multiple Access (WCDMA) standards, where a user equipment, such as a cell phone, is simultaneously connected to two or more cells (or cell sectors) during a call. On the uplink (user equipment-to-cell-site), all the cell site sectors that are actively supporting a call in soft handover send the bit stream that they receive back to the radio network controller, along with information about the quality of the received bits. The radio network controller examines the quality of all these bit streams and dynamically chooses the bit stream with the highest quality. Again, if the signal degrades rapidly, the chance is still good that a strong signal will be available at one of the other cell sectors that are supporting the call in soft handover.

In UTRAN, the high-speed downlink shared channel (HS-DSCH) does not use soft handover as dedicated channels do. Instead, a procedure called HS-DSCH serving cell change (HSCC) is utilized to make a hard handover. Soft handover is still used for the uplink, and an active set is managed in the same way as for non-high speed user equipment. The active set comprises a list of all active cells the user equipment is connected to in uplink soft handover. The user equipment continuously measures a common pilot channel (CPICH) and comprises a hysteresis to be fulfilled during a certain time (time to trigger). The update procedure for the list of active set of cells is schematically illustrated in FIG. 1. The active set update procedure is triggered by measurement report 1a, 1b or 1c, 101 informing the network controller, e.g. a serving radio network controller SRNC, that new cells have fulfilled the criterions to be added (measurement report 1a), deleted (measurement report 1b) or replaced (measurement report 1c) in the active set. The measurement report 1a, 1b, 1c is sent from the user equipment to a network controller, e.g. a serving radio network controller SRNC. A serving radio network controller is a type of radio network controller serving a particular user equipment and manages the connections towards that user equipment. When in HS-DSCH operation, the downlink is not in soft handover. Instead, one of the cells (typically the strongest) in the active set is marked as current HS-DSCH serving cell. The network controller then performs a radio link addition 102, and sets up the required radio links by sending and receiving setup request and response 103, 104 to/from the base station. The network controller transmits an active set update message 105 to the user equipment. When the user equipment has received the active set update from the network controller, it prepares 106 a processing, i.e. it reads the message and applies the new configuration, e.g. adds or deletes a radio link. The user equipment sends an active set update complete message 107 to the network controller confirming that the active set update was complete. The duration of an active set update procedure may, as an example, be calculated as follows:

$$T_{asu} = T\text{trig}1a + 2*T_{Uu} + 2*T_{Iub}$$

where
Ttrig1a=Time to trigger measurement report 1a=320 ms
$T_{Uu}$=Uu (Radio Interface) delay=100 ms
$T_{Iub}$=Iub (Radio Network Controller-NodeB Interface) delay=10 ms
$T_{asu}$=Time for active set update The signalling sequence for a (regular) HSCC procedure for hard handover is schematically shown in a combined flow and signalling diagram in FIG. 2. The user equipment performs a handover evaluation 200 to determine whether a handover shall be performed. This is triggered by a neighbour cell, target cell, being stronger than of the current cell, serving cell. A measurement report 1d is sent 201 from the user equipment to the network controller, e.g. the serving radio network controller (SRNC), indicating that another cell in the list of active set of cells has become the strongest one. As an example, the measurement report 1d is triggered to be sent from the user equipment when the measured common pilot channel level (CPICH) of the target cell is stronger than the serving cell by a certain hysteresis for a given time, governed by a parameter Ttrig1d (time to trigger measurement report 1d).

When not considering possible processing delays in the network controller and the user equipment, i.e. in simulation, the delay of the cell change procedure, $T_{cc}$, used may, as an example, be calculated as follows:

$$T_{cc} = T\text{trig}1d + T_{Uu} + 2*T_{Iub} + T_{Activation\ Time}$$

where
$T_{cc}$=Delay of cell change procedure
Ttrig1d=time to trigger measurement report 1d
$T_{Uu}$=Uu (Radio Interface) delay=100 ms $T_{Iub}$=Iub (Radio Network Controller-NodeB Interface) delay=10 ms $T_{Activation\ Time}$=Activation time When the network controller receives the measurement report 1d indicating the existence of this stronger cell, the network can take the decision to change the serving cell, i.e. it takes a handover decision 202. When a cell change is triggered, the network controller configures the source and target base stations (shown as only one base station in FIG. 2) with the new configuration, and the network controller also configures the Iub transport bearer. The network controller sends a radio link reconfiguration prepare message 203 to the base stations, and receives in return a radio link reconfiguration ready message 204 when the reconfiguration is ready. When both base stations (serving and target) have acknowledged the configuration, the network controller calculates the activation time 205 for the new configuration in case the switch to the new configuration is a synchronized procedure, meaning that the user equipment and the network controller shall move to the new configuration at the same time. The calculated activation time is relative to a connection frame number (CFN). An offset is needed to cover for the time it takes to transmit the reconfiguration commit messages 206 to both the user equipment and the base stations. The network controller sends a physical channel reconfiguration message 207 to the user equipment. The user equipment prepares a processing 208, i.e. it reads the message from the network controller and executes the handover 209, i.e. applies the new configuration, e.g. adds or deletes a radio link for the handover. When the handover is complete, the user equipment may send a physical channel reconfiguration complete message 210 to the network controller.

There is however a problem for user equipments travelling at very high speed, since the link quality of the serving cell, i.e. source cell, may degrade before the cell change procedure to the target cell is completed. If this happens before the network controller is able to successfully transmit the physical channel reconfiguration message 207, the network controller will no longer be able to reach the user equipment and the call will be dropped.

Enhancements to the HS-DSCH serving cell change procedure are consequently required regarding radio protocol procedures and structures, Iub/Iur protocols and user equipment, base station and radio resource management (RRM) performance requirements.

SUMMARY

It is thus an object of the present solution to provide an improved procedure for synchronizing a High-Speed Downlink Shared Channel (HS-DSCH) Serving Cell Change (HSCC) procedure in a communications system.

Further objects and advantages are evident from the following.

The objectives set forth above are achieved by providing, in a first aspect of the present solution, a method in a user equipment for setting up an activation time of a cell change of the user equipment from a serving cell to a target cell in a wireless communications network. After receiving a timing offset from a network controller, the user equipment calculates a cell change activation time based on the timing offset. The user equipment then transmits the calculated activation to the time controller. Then the user equipment receives an approval of the cell change from the network controller. The user equipment will then move from the serving cell to the target cell at the activation time if it has received the approval.

In a second aspect of the solution there is provided a method in a network controller for setting up an activation time of a cell change of a user equipment from a serving cell to a target cell in a wireless communications network. The network controller transmits a timing offset to the user equipment and receives an activation time from the user equipment. Then the network controller decides to move the user equipment to the target cell. The serving cell and the target cell are configured with the activation time. The network controller receives a configuration confirmation from the serving cell and the target cell, and the network controller sends an approval of the cell change to the user equipment.

In a third aspect of the present solution there is provided an arrangement in a user equipment in a wireless communication network. The user equipment is arranged to be capable of setting up an activation time of a cell change from a serving cell to a target cell. The user equipment arrangement comprises a receiver arranged to receive a timing offset from a network controller through an interface, a processor arranged to calculate a cell change activation time based on the timing offset. The arrangement further comprises a transmitter arranged to transmit the activation time through the interface to the network controller. The receiver is further arranged to receive an approval of the cell change through the interface. The processor is further arranged to move from the serving cell to the target cell at the activation time if the approval has been received.

In a fourth aspect of the present solution there is provided an arrangement in a network controller. The network controller is arranged to set up an activation time of a cell change of a user equipment from a serving cell to a target cell in a wireless communications network. The network controller arrangement comprises a transmitter arranged to transmit a timing offset to the user equipment, a receiver arranged to receive an activation time from the user equipment. The arrangement further comprises a processor arranged to decide to move the user equipment to the target cell, and arranged to configure the serving cell and the target cell with the activation time. The receiver is further arranged to receive a configuration confirmation from the serving cell and the target cell, and the transmitter is further arranged to send an approval of the cell change to the user equipment.

Since the user equipment can decide an activation time in which it will move from a source cell to a target cell it allows a synchronized operation for HS-DSCH serving cell change (HSCC). The synchronized operation may also be possible when the cell change command is signalled over HS-SCCH from the target base station. This provides an advantage of simplifying L1 (lower physical layer) termination and user plane handling over the interface between a base station and a network controller (Iub). A further advantage is that the offset used to calculate the activation time is controlled by the network controller, and can thus be optimised based on the network configuration and delays. Another advantage of this is that it allows the network controller and user equipment to simultaneously change from source to target cell during handover.

Further advantages of the present solution and embodiments thereof will appear from the following detailed description of the solution.

It goes without saying that the above aspects of the solution may be combined in the same embodiment. The objects of this solution are obtained as described in the accompanying claims.

BRIEF DESCRIPTION OF THE DRAWINGS

The solution will now be further described in more detail in the following detailed description by reference to the appended drawings illustrating embodiments of the solution and in which.

DETAILED DESCRIPTION

Basically the present solution relates to a method and arrangement that allows synchronized operation for HS-DSCH serving cell change (HSCC) by letting the user equipment decide an activation time, i.e. a connection frame number, in which it will move from a serving cell to a target cell. The user equipment reports this connection frame number to the network controller in a measurement report that triggers the cell change.

The user equipment is then allowed to move to the target cell at the connection frame number if it gets scheduled on HS-SCCH in the target cell before the connection frame number. If it does not, it stays in the source cell.

Figure 1:
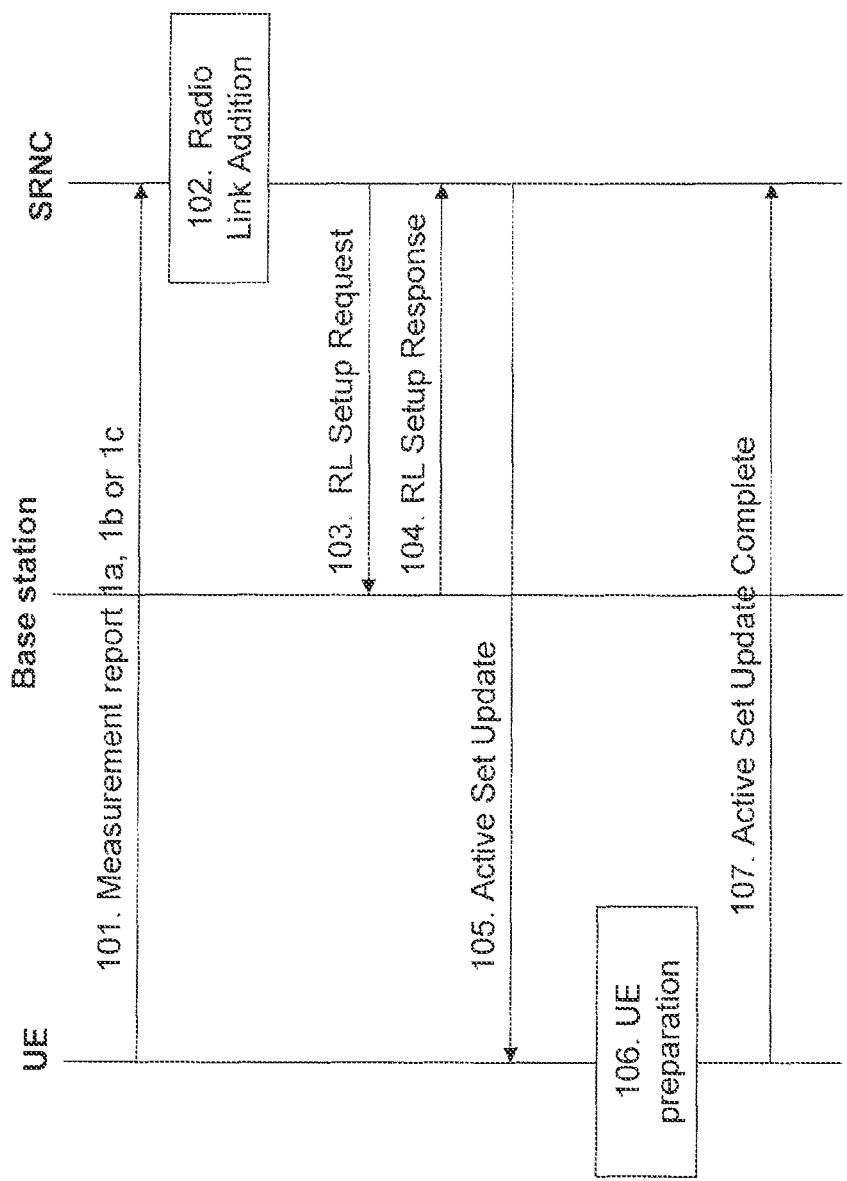
FIG. 1 is a combined flowchart and signalling diagram illustrating a prior art active set update procedure.
Figure 2:
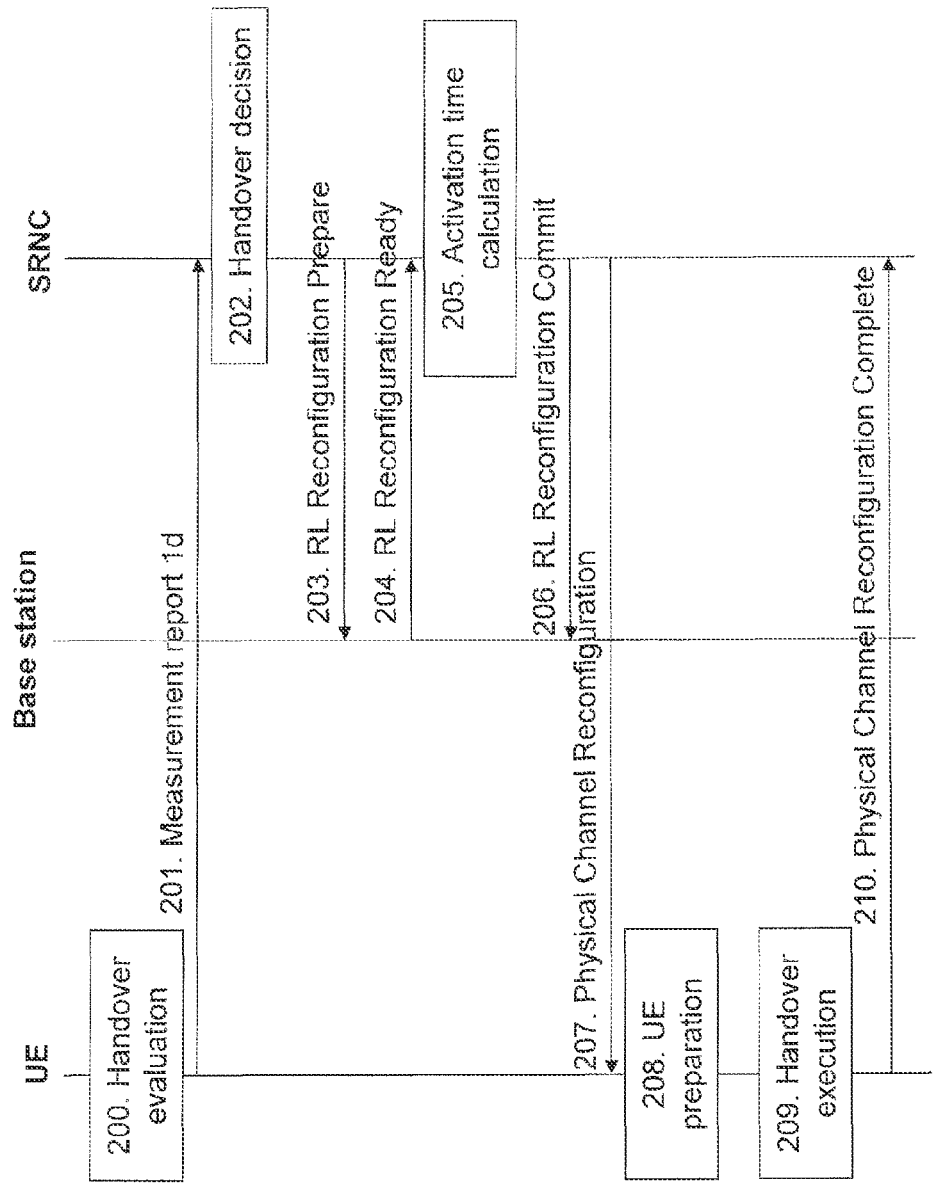
FIG. 2 is a combined flowchart and signalling diagram illustrating a prior art procedure for HS-DSCH serving cell change.
Figure 3:
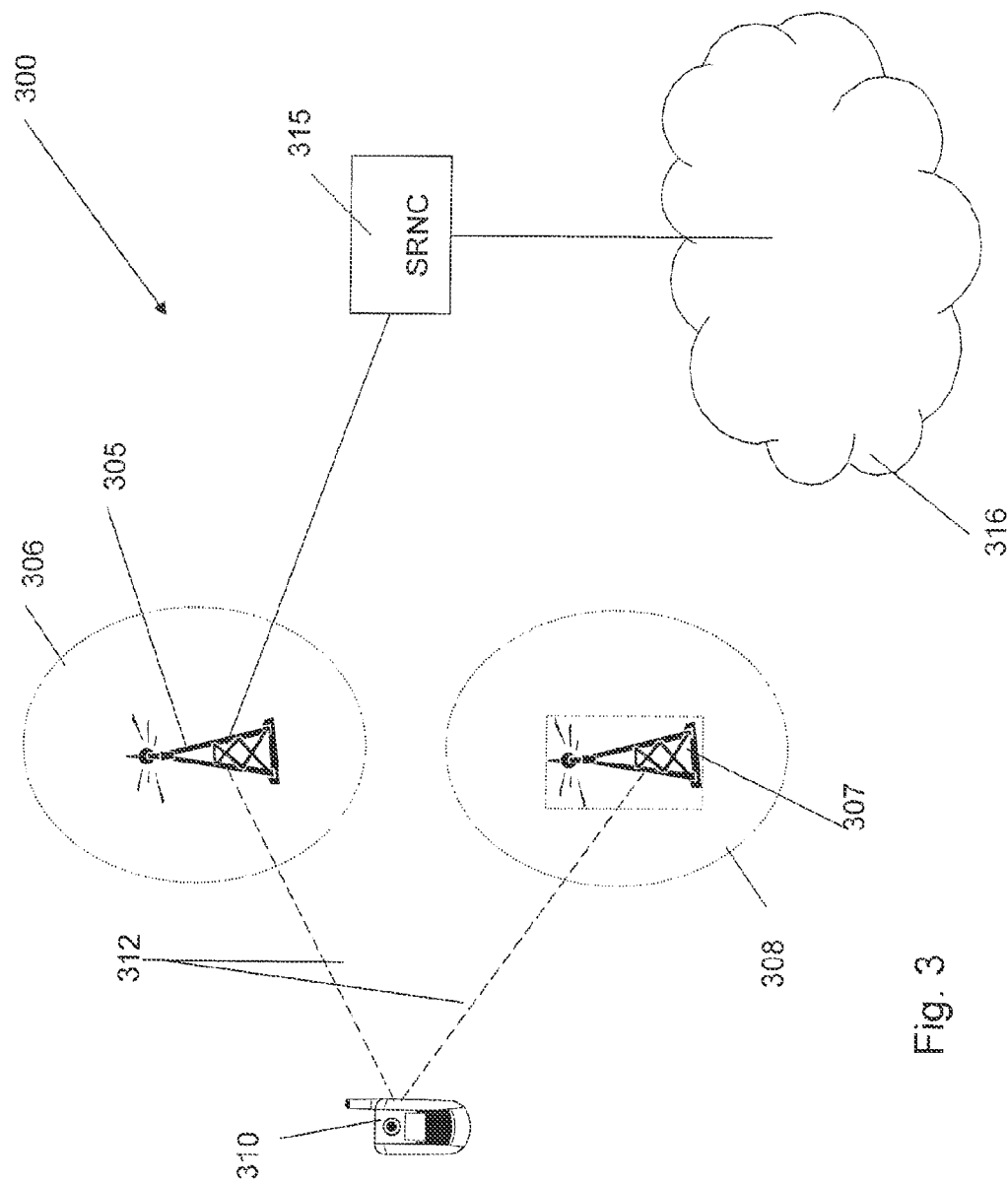
FIG. 3 is a schematic block diagram illustrating a wireless communication network.

FIG. 3 shows a wireless communication network 300, using technologies such as e.g. UTRAN. The wireless communication network 300 comprises base stations serving cells, such as a base station 305 serving a cell 306 and a base station 307 serving a cell 308. The base stations 305 and 307 are radio base stations, e.g. in a radio access network, and may be referred to as NodeB. The base station 305 is arranged to wirelessly communicate with a user equipment 310 via e.g. radio frequency transmitters and receivers which also may be responsible for transmitting and receiving data over an air interface 312. The user equipment 310 may be referred to as a node device. The wireless communication network 300 further comprises a radio network controller 315 adapted to control the base stations 305, 307 and other base stations connected to it. The radio network controller 315 is the point of contact for the user equipment 310 towards the communication network 300. The network controller 315 is connected to a core network 316 providing services to the user equipment 310.

The user equipment 310 moves from cell 306 towards the neighbor cell 308. The user equipment 310 uses cell change procedures to move from one cell to another cell when a stronger neighbor cell is detected. The user equipment 310 moves from one cell to another cell at an activation time.

In the cell change procedure, the user equipment 310 uses a list of active set of cells. The list of active set of cells comprises a list of cells to which the user equipment 310 can move from the serving cell 306.

Figure 4:
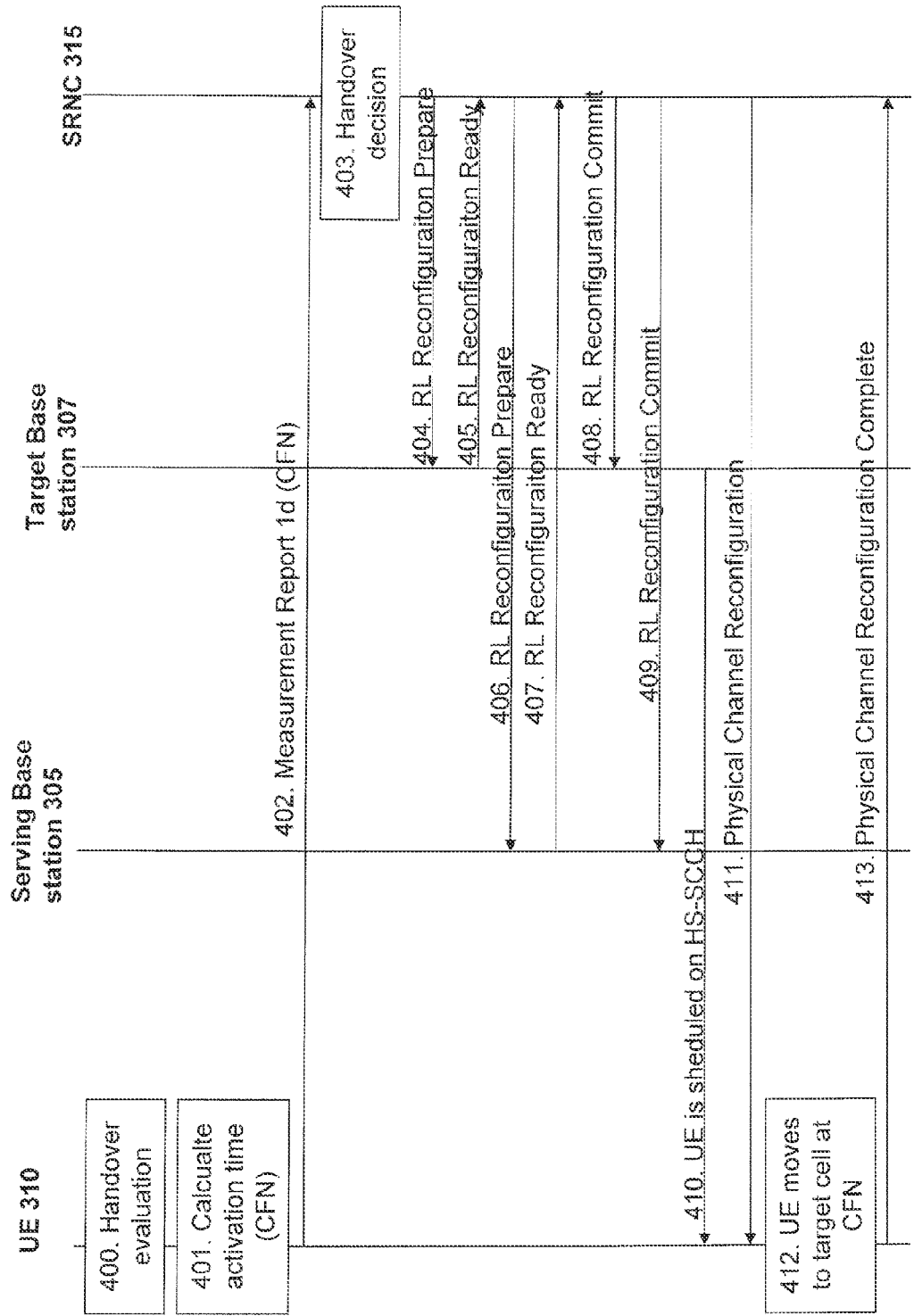
FIG. 4 is a combined flowchart and signalling diagram illustrating a synchronized cell change procedure.

FIG. 4 is a combined flowchart and signalling diagram illustrating an example of a cell change procedure modified to be synchronized according to embodiments of the present solution. According to this example, the target cell 308 is preloaded with the high speed configuration during an active set update procedure (not shown). The method comprises the following steps:

Step 400

A handover evaluation is performed in the user equipment 310 because it has noticed that another cell in the list of active set of cells has become the strongest one.

Step 401

The user equipment 310 calculates the activation time based on a timing offset that is previously signalled by the network controller 315. The timing offset may be signalled to the user equipment 310 either by active set update, broadcast or dedicated signalling at call setup.

The calculation of the activation time may be initiated when sending measurement report 1*d* during signalling procedure for HS-DSCH serving cell change is triggered in the user equipment 310.

The activation time may e.g. be expressed as a connection frame number (CFN) in which the user equipment 310 will move from the serving cell 306 to the target cell 308. The calculated activation time, e.g. comprised in the measurement report 1*d* of a handover request message, is transmitted to the network controller 315 forming a basis for a handover decision.

Step 403

When the network controller 315 receives the measurement report 1*d*, it makes the handover decision whether to move the user equipment 310 to the target cell 308 or not. If the measurement report 1*d* indicates the existence of a "stronger" neighbour cell 308 than the current serving cell 306, i.e. source cell, and based on other considerations, the network controller 315 may take a decision to move the user equipment 310 to this neighbour cell, target cell 308.

Step 404

The network controller 315 sends a radio link reconfiguration prepare message to the target base station 307, to reconfigure the target base station 307 informing it also of the connection frame number in which the cell change will occur. The user equipment 310 listens to the target cell High-Speed Downlink Shared Channel (HS-DSCH) Shared Control Channel (HS-SCCH) until the calculated activation time is reached.

Step 405

The target base station 307 sends a radio link reconfiguration ready message to the network controller 315 when it has performed its reconfiguration preparations.

Step 406

Then the network controller 315 sends a radio link reconfiguration prepare message to the serving base station 305 to reconfigure the serving base station 305 informing it also of the connection frame number in which the cell change will occur.

Step 407

The serving base station 305 sends a radio link reconfiguration ready message to the network controller 315 when it has performed its reconfiguration preparations.

Step 408

The network controller 315 sends a radio link configuration commit message to the target base station 307.

Step 409

The network controller 315 also sends a radio link configuration commit message to the serving base station 305.

Step 410

When the target base station 307 has received the radio link configuration commit message it will schedule the user equipment 310 on the HS-SCCH if the message has been received before the calculated activation time. The user equipment 310 regards the cell change approved upon receipt of an indication of this scheduling.

Step 411

The network controller 315 may also transmit the handover confirm message over the target cell 308. This may be done by the network controller 315 transmitting a physical channel reconfiguration message to the user equipment 310.

Step 412

The user equipment 310 moves to the target cell 308 at the connection frame number. Note that this is only possible when the network controller 315 schedules the user equipment 310 on HS-SCCH in the target cell 308 or transmits the handover command in the serving cell 305 before the connection frame number. However, if the scheduling message in step 410 has been received after the activation time, the user equipment 310 remains in the serving cell 305, i.e. no cell change is performed.

Step 413

There may also be a need for the user equipment 310 to acknowledge the receipt of the HS-SCCH command. This may be done by the user equipment 310 transmitting a "Reconfiguration Complete" message to the network controller 315.

Figures 5, 6:
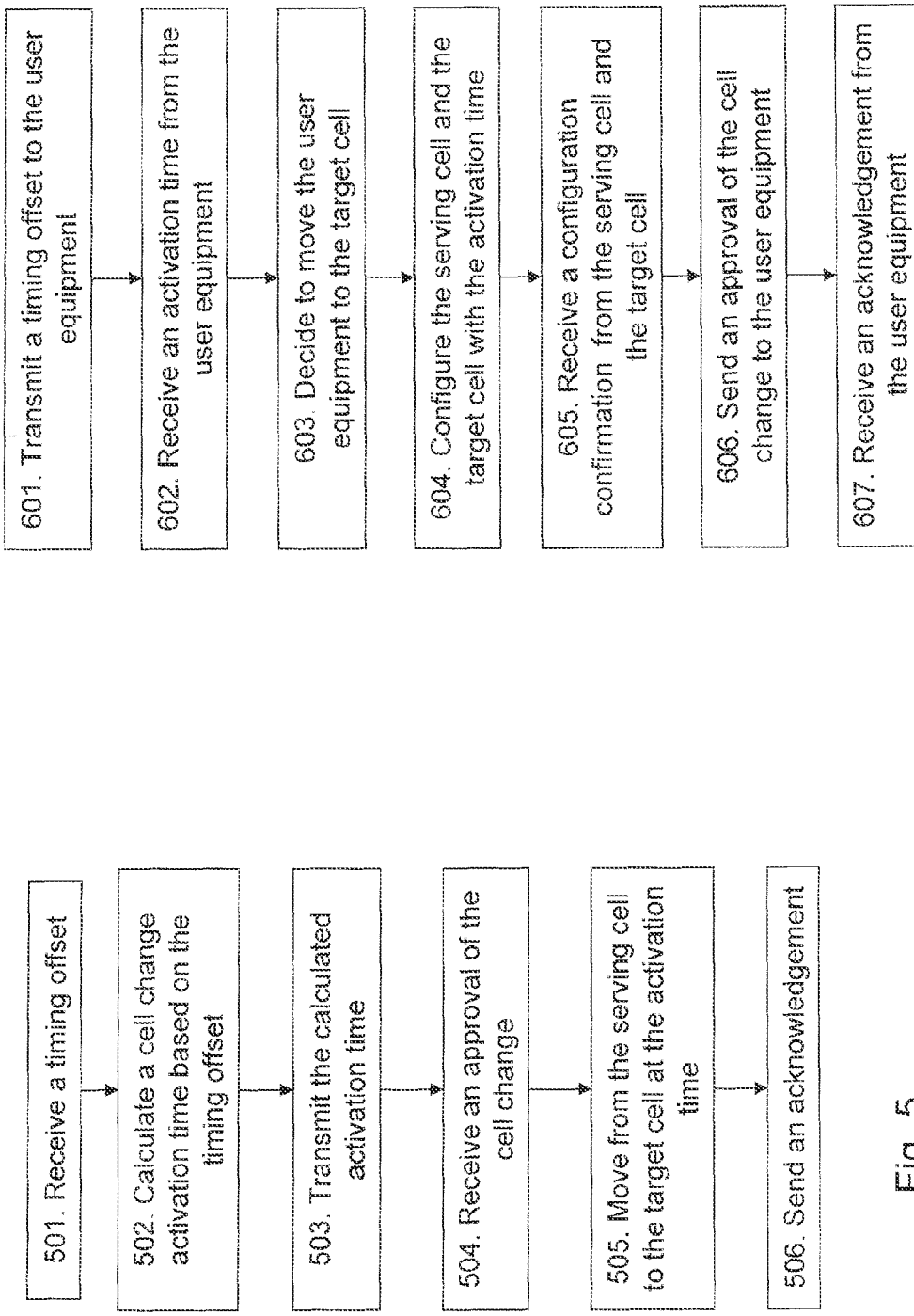
FIG. 5 is a flowchart illustrating embodiments of a method in a user equipment.
FIG. 6 is a flowchart illustrating embodiments of a method in a network controller.

The method described above will now be described seen from the perspective of the user equipment 310. FIG. 5 is a flowchart describing the present method in the user equipment 310, for setting up an activation time of a cell change of the user equipment 310 from the serving cell 305 to the target cell 308 in a wireless communications network 300. The method comprises the following steps to be performed in the user equipment 310:

Step 501

The user equipment 310 receives a timing offset from a network controller 315.

In some embodiments the timing offset may be received from the network controller 315 through an active set update procedure.

According to some embodiments the timing offset may be received from the network controller 315 through broadcast or dedicated signalling at call setup.

In some embodiments the target cell 308 may be preloaded with a high speed serving cell change procedure.

Step 502

The user equipment 310 calculates a cell change activation time based on the timing offset.

In some embodiments the activation time may be a connection frame number in which the user equipment 310 will move to the target cell 308.

Step 503

The user equipment 310 transmits the calculated activation time to the network controller 315.

In some embodiments the activation time may be transmitted to the network controller 315 in a measurement report.

Step 504

The user equipment 310 receives an approval of the cell change from the network controller 315.

In some embodiments the approval of the cell change may comprise scheduling the user equipment 310 on a high speed downlink control channel in the target cell 308.

In some embodiments the user equipment 310 may be arranged to monitor a target cell 308 high speed downlink control channel until the activation time expires.

Step 505

The user equipment 310 moves from the serving cell 305 to the target cell 308 at the activation time if the approval has been received.

Step 506

This is an optional step. The user equipment 310 may send an acknowledgement to the network controller 315.

The method described above will now be described seen from the perspective of the network controller 315. FIG. 6 is a flowchart describing the present method in the network controller 315 for setting up an activation time of a cell change of the user equipment 310 from the serving cell 306 to the target cell 308 in a wireless communications network 300. The method comprises the following steps to be performed in the network controller 315:

Step 601

The network controller 315 transmits a timing offset to the user equipment 310.

In some embodiments the timing offset may be transmitted to the user equipment 310 through an active set update procedure.

In some embodiments the timing offset may be transmitted to the user equipment 310 through broadcast or dedicated signalling at call setup.

In some embodiments the target cell 308 may be preloaded with a modified high speed serving cell change procedure.

Step 602

The network controller 315 receives an activation time from the user equipment 310.

In some embodiments the activation time may be received from the user equipment 310 in a measurement report.

In some embodiments the activation time may be a connection frame number in which the user equipment 310 will move to the target cell 308.

Step 603

The network controller 315 decides to move the user equipment 310 to the target cell 308.

Step 604

The network controller 315 configures the serving cell 306 and the target cell 308 with the activation time.

Step 605

The network controller 315 receives a configuration confirmation from the serving cell 306 and the target cell 308.

Step 606

The network controller 315 sends an approval of the cell change to the user equipment 310.

In some embodiments the approval of the cell change may comprise scheduling the user equipment 310 on a high speed downlink control channel in the target cell 308.

Step 607

This is an optional step. The network controller 315 may receive an acknowledgement from the user equipment 310.

Figure 7:
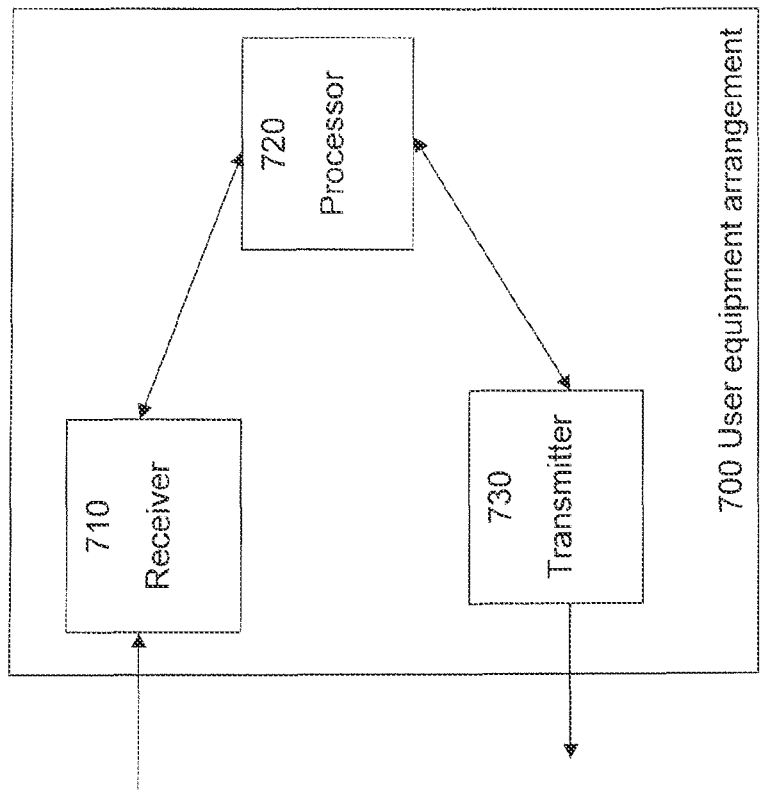
FIG. 7 is a schematic block diagram illustrating embodiments of a user equipment arrangement.

To perform the method steps shown in FIG. 5 for setting up an activation time of a cell change from a serving cell 306 to a target cell 308, the user equipment 310 comprises a user equipment arrangement 700 as shown in FIG. 7. The user equipment 310 is arranged to be capable of setting up an activation time of a cell change from a serving cell 306 to a target cell 308. The activation time may be a connection frame number in which the user equipment 310 will move to the target cell 308.

The user equipment arrangement 700 comprises a receiver 710 arranged to receive a timing offset from a network controller 315 through an interface 312. The receiver 710 may be further arranged to receive the timing offset the network controller 315 through an active set update procedure, and it may also be arranged to receive the timing offset from the network controller 315 through broadcast or dedicated signalling at call setup.

The arrangement 700 further comprises a processor 720 arranged to calculate a cell change activation time based on the timing offset, and a transmitter 730 arranged to transmit the activation time through the interface 312 to the network controller 315. The transmitter 730 may be arranged to transmit the activation time to the network controller 315 in a measurement report.

The receiver 710 is further arranged to receive an approval of the cell change through the interface 312, and the processor 720 is further arranged to move from the serving cell 306 to the target cell 308 at the activation time if the approval has been received. The approval of the cell change may comprise scheduling the user equipment 310 on a high speed downlink control channel in the target cell 308, and the user equipment 310 may be arranged to monitor a target cell 308 high speed downlink control channel until the activation time expires.

The transmitter 730 may further be arranged to send an acknowledgement through the interface 312 to the network controller 315. The target cell 308 may be preloaded with a high speed serving cell change procedure.

Figure 8:
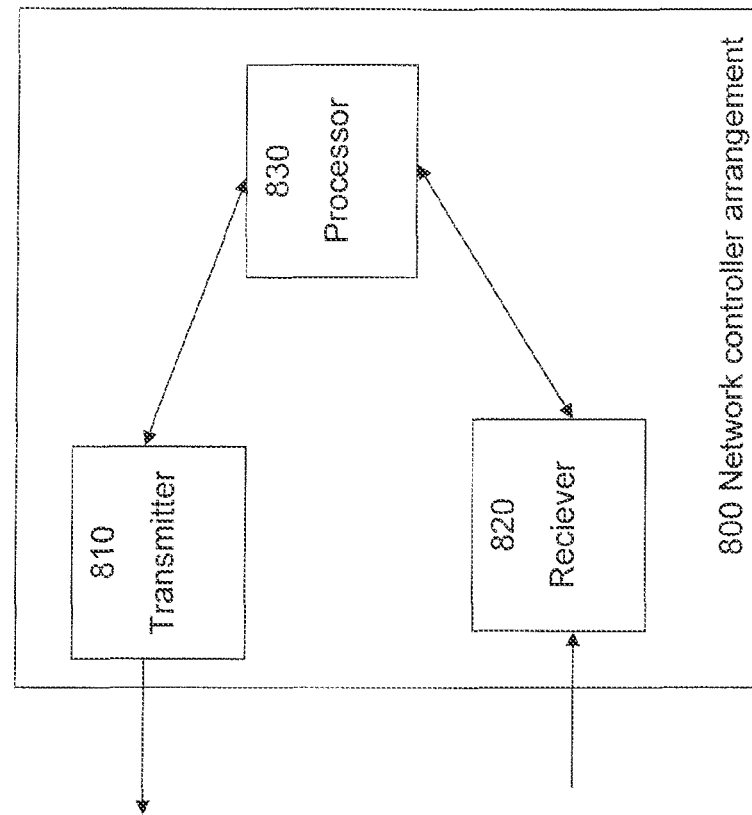
FIG. 8 is a schematic block diagram illustrating embodiments of a network controller arrangement.

To perform the method steps shown in FIG. 6 for setting up an activation time of a cell change from a serving cell 306 to a target cell 308, the network controller 315 comprises a network controller arrangement 800 as shown in FIG. 8. The network controller 315 is arranged to set up an activation time of a cell change of a user equipment 310 from a serving cell 306 to a target cell 308 in a wireless communications network 300.

The network controller arrangement 800 comprises a transmitter 810 arranged to transmit a timing offset to the user equipment 310. The transmitter 810 may further be arranged to transmit the timing offset to the user equipment 310 through an active set update procedure, and the transmitter 810 may further be arranged to transmit the timing offset to the user equipment 310 through broadcast or dedicated signalling at call setup. The arrangement 800 further comprises a receiver 820 arranged to receive an activation time from the user equipment 310. The activation time may be a connection frame number in which the user equipment 310 will move to the target cell 308.

The network controller arrangement 800 further comprises a processor 830 arranged to decide to move the user equipment 310 to the target cell 308 and arranged to configure the serving cell 306 and the target cell 308 with the activation time. The receiver 820 is further arranged to receive a configuration confirmation from the serving cell 306 and the target cell 308. The transmitter 810 may be further arranged to send an approval of the cell change to the user equipment 310. The approval of the cell change may comprise scheduling the user equipment 310 on a high speed downlink control channel in the target cell 308. The receiver 820 may be further arranged to receive an acknowledgement from the user equipment 310. The target cell 308 may be preloaded with a modified high speed serving cell change procedure.

The present mechanism for setting up an activation time of a cell change from a serving cell 306 to a target cell 308 in a wireless communication network 300 may be implemented through one or more processors, such as a processor 720 in the user equipment arrangement 700 depicted in FIG. 7 or a processor 830 in the network controller arrangement 800 depicted in FIG. 8, together with computer program code for performing the functions of the present solution. The program code mentioned above may also be provided as a computer program product, for instance in the form of a data carrier carrying computer program code for performing the present solution when being loaded into the user equipment 310 and/or network controller 315. One such carrier may be in the form of a CD ROM disc. It is however feasible with other data carriers such as a memory stick. The computer program code can furthermore be provided as pure program code on a server and downloaded to the user equipment 310 and/or network controller 315 remotely.

An advantage with embodiments of the present solution is that the HSCC procedure may be synchronized, also when the cell change command is signalled over HS-SCCH from the target base station 307. This simplifies L1 termination and user plane handling over Iub.

While various embodiments/variations of the present solution have been described above, it should be understood that they have been presented by way of example only, and not limitation. Thus, the breadth and scope of the present solution should not be limited by any of the above-described exemplary embodiments. Further, unless stated, none of the above embodiments are mutually exclusive. Thus, the present solution may comprise any combinations and/or integrations of the features of the various embodiments.

Additionally, while the processes described above are shown as a sequence of steps, this was done solely for the sake of illustration. Accordingly, it is contemplated that some steps may be added, some steps may be omitted and the order of the steps may be re-arranged.

The invention claimed is:

1. A method in a user equipment for setting up an activation time of a high speed downlink shared channel cell change of the user equipment from a first cell to a second cell in a wireless communications network, the method comprising:
   receiving a timing offset from the wireless communications network through broadcast or dedicated signaling at call setup;
   calculating a high speed downlink shared channel cell change activation time based on the received timing offset, the activation time indicating when the user equipment can perform a cell change from the first cell to the second cell;
   transmitting the calculated activation time from the user equipment to the wireless communications network;
   receiving an approval of the downlink shared channel high speed cell change from the wireless communications network; and
   performing a cell change from the first cell to the second cell at the activation time if the approval has been received.

2. The method of claim 1, further comprising sending an acknowledgement to the wireless communications network.

3. The method of claim 1, wherein the activation time comprises a connection frame number in which the user equipment will initiate the cell change.

4. The method of claim 1, wherein receiving the approval of the cell change comprises receiving an indication that the user equipment has been scheduled on a high speed downlink control channel in the second cell.

5. The method of claim 1, further comprising monitoring a high speed downlink control channel of the second cell until the activation time expires.

6. The method of claim 1, further comprising transmitting the activation time to the wireless communications network in a measurement report.

7. A method in a wireless communications network for setting up an activation time of a high speed downlink shared channel cell change of a user equipment from a first cell to a second cell in a wireless communications network, the method comprising:
   transmitting a timing offset from a network node to the user equipment through broadcast or dedicated signalling at call setup;
   receiving an activation time from the user equipment, the activation time indicating when the user equipment can perform a cell change from the first cell to the second cell;
   deciding to initiate the cell change to change the user equipment from the first cell to the second cell;
   configuring the first cell and the second cell with the activation time;
   receiving a configuration confirmation from the first cell and the second cell; and
   sending an approval of the high speed downlink shared channel cell change to the user equipment.

8. The method of claim 7, further comprising receiving an acknowledgement from the user equipment.

9. The method of claim 7, wherein the activation time is a connection frame number in which the user equipment will perform the cell change.

10. The method of claim 7, wherein sending the approval of the high speed downlink shared channel cell change comprises:
    scheduling the user equipment on a high speed downlink control channel in the second cell; and
    transmitting to the user equipment an indication that the user equipment has been scheduled.

11. The method of claim 7, further comprising receiving the activation time from the user equipment in a measurement report.

12. A user equipment apparatus in a wireless communication network wherein the apparatus is configured to set up an activation time of a high speed downlink shared channel cell change from a first cell to a second cell, the apparatus comprising:
    a receiver configured to receive a timing offset from the wireless communications network through broadcast or dedicated signalling at call setup;
    a processor configured to calculate a high speed downlink shared channel cell change activation time based on the received timing offset, the activation time indicating when the user equipment can perform a cell change from the first cell to the second cell; and
    a transmitter configured to transmit the calculated activation time to the wireless communications network,
    wherein the receiver is further configured to receive an approval of the high speed downlink shared channel cell change through the interface; and
    wherein the processor is further configured to perform a cell change from the first cell to the second cell at the activation time if the approval has been received.

13. The apparatus of claim 12, wherein the transmitter is further configured to send an acknowledgement to the wireless communications network.

14. The apparatus of claim 12, wherein the activation time is a connection frame number in which the apparatus will move to the second cell.

15. The apparatus of claim 12, wherein the receiver is further configured to receive the approval of the high speed downlink shared channel cell change by receiving an indication that the user equipment has been scheduled on a high speed downlink control channel in the second cell.

16. The apparatus of claim 12, wherein the apparatus is configured to monitor a high speed downlink control channel of the second cell until the activation time expires.

17. The apparatus of claim 12, wherein the apparatus is configured to transmit the activation time to the wireless communications network in a measurement report.

18. A wireless communication apparatus, wherein the apparatus is capable of setting an activation time for a high speed downlink shared channel cell change of a user equipment from a first cell to a second cell in a wireless communications network, the apparatus comprising:
    a transmitter configured to transmit a timing offset to the user equipment through broadcast or dedicated signalling at call setup;
    a receiver configured to receive an activation time from the user equipment, the activation time indicating when the user equipment can perform a cell change from the first cell to the second cell; and
    a processor configured to decide whether to initiate the cell change to change the user equipment from the first cell to the second cell and to configure the first cell and the second cell with the activation time,
    wherein the receiver is further configured to receive a configuration confirmation from the first cell and the second cell; and
    wherein the transmitter is further configured to send an approval of the high speed downlink shared channel cell change to the user equipment.

19. The apparatus of claim 18, wherein the receiver is further configured to receive an acknowledgement from the user equipment.

20. The apparatus of claim 18, wherein the activation time is a connection frame number in which the user equipment will initiate the cell change.

21. The apparatus of claim 18, wherein the transmitter is configured to send the approval of the high speed downlink shared channel cell change by:
    scheduling the user equipment on a high speed downlink control channel in the second cell; and
    transmitting to the user equipment an indication that the user equipment has been scheduled.

22. The apparatus of claim 18, wherein the receiver is configured to receive the activation time from the user equipment in a measurement report.

* * * * *